(12) United States Patent
Chen

(10) Patent No.: US 9,292,140 B2
(45) Date of Patent: Mar. 22, 2016

(54) TOUCH PANEL

(71) Applicant: HengHao Technology Co. LTD, Taoyuan County (TW)

(72) Inventor: Chi-An Chen, Taipei (TW)

(73) Assignee: Henghao Technology Co. Ltd., Pingzhen, Taoyuan County (TW)

( * ) Notice: Subject to any disclaimer, the term of this patent is extended or adjusted under 35 U.S.C. 154(b) by 114 days.

(21) Appl. No.: 14/050,287

(22) Filed: Oct. 9, 2013

(65) Prior Publication Data

US 2015/0085201 A1 Mar. 26, 2015

(30) Foreign Application Priority Data

Sep. 26, 2013 (TW) .............................. 102134673 A

(51) Int. Cl.
*G06F 3/041* (2006.01)
*G06F 3/044* (2006.01)

(52) U.S. Cl.
CPC ...................................... *G06F 3/044* (2013.01)

(58) Field of Classification Search
CPC .......... G06F 3/044; G09G 2300/0842; G09G 2320/0276; G09G 3/3225; G09G 3/3291
See application file for complete search history.

(56) References Cited

U.S. PATENT DOCUMENTS

| 2007/0292659 | A1 | 12/2007 | Li et al. | |
|---|---|---|---|---|
| 2009/0206954 | A1* | 8/2009 | Hashimoto | H03H 9/02992 333/195 |
| 2009/0283342 | A1* | 11/2009 | Schediwy | G06F 3/044 178/19.03 |
| 2010/0214247 | A1* | 8/2010 | Tang | G06F 3/044 345/173 |
| 2012/0050222 | A1 | 3/2012 | Magami et al. | |
| 2012/0154887 | A1* | 6/2012 | Kim | G02B 1/116 359/230 |

FOREIGN PATENT DOCUMENTS

| JP | 3181649 U | 2/2013 |
|---|---|---|
| KR | 20130013695 A | 2/2013 |

OTHER PUBLICATIONS

Office Action Dated Oct. 31, 2014 in corresponding Korean Patent Application No. 20-2013-0008728.

* cited by examiner

*Primary Examiner* — Kumar Patel
*Assistant Examiner* — Insa Sadio
(74) *Attorney, Agent, or Firm* — Donald E. Stout; Stout, Uxa & Buyan, LLP

(57) ABSTRACT

A touch panel includes dummy electrodes, disposed in a transmit electrode layer or a receive electrode layer whichever is below an isolation layer. In one embodiment, an anti-reflective layer includes at least one composite refractive-index three-layer structure. In another embodiment, the receive electrode layer is disposed below the isolation layer, and the receive electrode layer and the dummy electrodes are electrically coupled to a same electric potential.

8 Claims, 4 Drawing Sheets

100

| CG | ~11 |
| --- | --- |
| RX | ~12 |
| ISO | ~13 |
| TX | ~14 |
| SUB | ~15 |

| CG | ~21 |
| --- | --- |
| AR | ~22 |
| TX | ~23 |
| ISO | ~24 |
| RX | ~25 |
| SUB | ~26 |

| LI | ~221 |
| --- | --- |
| HI | ~222 |
| LI | ~223 |

FIG. 3A

TOUCH PANEL

BACKGROUND OF THE INVENTION

1. Field of the Invention

The present invention generally relates to a touch panel, and more particularly to a touch panel with dummy electrodes.

2. Description of Related Art

A touch screen is an input/output device that adopts sensing technology and display technology, and is mainly composed of a touch panel and a liquid crystal display module. FIG. 1 shows a cross-sectional view of a conventional touch panel 100, which includes, from top to bottom, a transparent cover (CG) layer 11, a receive (RX) layer 12, an isolation (ISO) layer 13, a transmit (TX) layer 14 and a transparent substrate (SUB) 15. The receive layer 12 is commonly disposed above the isolation layer 13 (while the transmit layer 14 is disposed below the isolation layer 13) in the conventional touch panel 100 to prevent sensing receive signal from being affected by the liquid crystal display module.

The receive layer 12 and the transmit layer 14 of the touch panel 100 are composed of electrode lines. A gap needs to be reserved between adjacent electrode lines to avoid electrical shorting. The gap, however, can result in a trace phenomenon when users look at the touch panel 100. In addition to the trace phenomenon, optical transmittance can be reduced due to substantial differences between refractive indices of the gaps and electrode lines. Moreover, the touch panel 100 of the conventional layout as shown in FIG. 1 tends to be ill-adapted to stringent environments because of an incapability of sustaining high temperature and high humidity for a long time.

A need has thus arisen to propose a novel touch panel that can attenuate or overcome drawbacks of the conventional touch panel.

SUMMARY OF THE INVENTION

In view of the foregoing, it is an object of the embodiment of the present invention to provide a touch panel in order to reduce trace phenomena and increase optical transmittance, and/or make a touch panel capable of passing more stringent test criteria or requirements.

According to one embodiment, a touch panel includes an anti-reflective layer, a transmit layer, an isolation layer, a receive layer and a plurality of dummy electrodes. The anti-reflective layer includes at least one composite refractive-index three-layer structure. The transmit layer, the isolation layer and the receive layer are disposed below the anti-reflective layer, the isolation layer being disposed between the transmit layer and the receive layer. The dummy electrodes are disposed in the transmit layer or the receive layer whichever is located below the isolation layer.

According to another embodiment, a touch panel includes, from top to bottom, a transmit layer, an isolation layer and a receive layer. A plurality of dummy electrodes are disposed in the receive layer, the receive layer and the dummy electrodes being electrically coupled to a same electric potential.

BRIEF DESCRIPTION OF THE DRAWINGS

FIG. 1 shows a cross-sectional view of a conventional touch panel;

FIG. 2 shows a cross-sectional view of a touch panel according to a first embodiment of the present invention;

FIG. 3A and FIG. 3B show, respectively, a composite reflective-index three-layer structure, and a pair of composite reflective-index three-layer structures, of an anti-reflective layer of FIG. 2;

FIG. 4A shows a top view of dummy electrodes;

DETAILED DESCRIPTION OF THE INVENTION

Figures 3B, 4A:
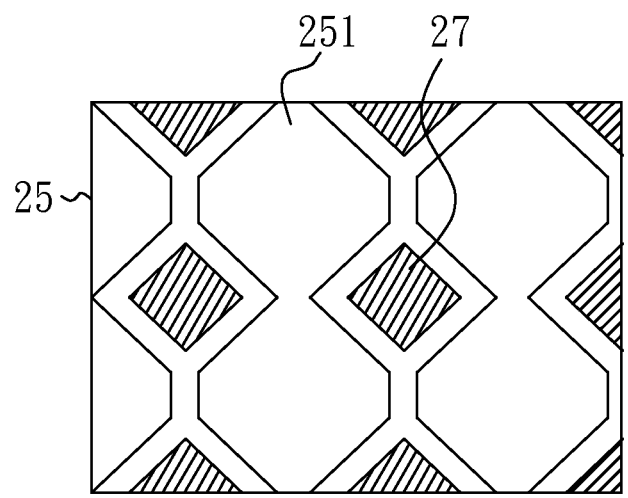

FIG. 2 shows a cross-sectional view of a touch panel 200 according to a first embodiment of the present invention. In the specification, "above" or "top" points toward a touch position, and "below" or "bottom" points opposite the touch position or points toward a display module (not shown), such as a liquid crystal display module. Only primary composing layers of the touch panel 200 are shown in the figures. A person skilled in the pertinent art could modify the shown structure by inserting further layers, when needed.

In the embodiment, the touch panel 200 includes, from top to bottom, a transparent cover (CG) layer 21, an anti-reflective (AR) layer 22, a transmit (TX) layer 23, an isolation (ISO) layer 24, a receive (RX) layer 25 and a transparent substrate (SUB) 26. In one embodiment, the transmit layer 23 (e.g., indium tin oxide (ITO) film) is formed on a bottom of the transparent cover layer 21 (e.g., cover glass) via the anti-reflective layer 22, and the receive layer 25 (e.g., ITO film) is formed on a bottom of the transmit layer 23 via the isolation layer 24, thereby resulting in a glass-film (G1F) structure. As will be appreciated the embodiment shown should not be restricted to that of the G1F structure.

Compared with a conventional touch panel (such as the touch panel 100 exemplified in FIG. 1), the transmit layer 23 and the receive layer 25 of the touch panel 200 (FIG. 2) are formed in an order opposite to that of the touch panel 100. Although the receive layer 25 of the embodiment is disposed in a lower position and is liable to interference from the display module, the embodiment, due to its specific anti-reflective layer 22 and the receive layer 25, nevertheless is capable of tolerating the interference, reducing trace phenomenon and increasing optical transmittance. In an alternative embodiment, the transmit layer 23 may be disposed below the isolation layer 24, and the receive layer 25 may be disposed above the isolation layer 24.

According to one aspect of the embodiment, the anti-reflective layer 22 includes a composite reflective-index three-layer structure, as illustrated in FIG. 3A, which is composed of a high-reflective-index (HI) layer 222 sandwiched between two low-reflective-index (LI) layers 221 and 223. In other words, the anti-reflective layer 22 includes, from top to bottom, a first low-reflective-index layer 221, a high-reflective-index layer 222 and a second low-reflective-index layer 223, where a reflective index of the high-reflective-index layer 222 is higher than reflective indices of the first low-reflective-index layer 221 and the second low-reflective-index layer 223. In one embodiment, the first low-reflective-index layer 221, the high-reflective-index layer 222 and the second low-reflective-index layer 223 are continuously formed without an intermediate layer or material. In one embodiment, the first low-reflective-index layer 221 has a thickness of about 10-200 μm, the high-reflective-index layer 222 has a thickness of about 10-500 µm, and the second low-reflective-index layer 223 has a thickness of about 10-500 µm. The first low-reflective-index layer 221, the high-reflective-index layer 222 and the second low-reflective-index layer 223 of the embodiment may be made at least of silicon nitride ($SiN_x$) and silicon dioxide ($SiO_2$). The anti-reflective layer 22 of the embodiment may include more than one composite reflective-index three-layer structure as exemplified in FIG. 3B, in which two of composite reflective-index three-layer structures are continuously formed to result in the anti-reflective layer 22.

Figure 4B:
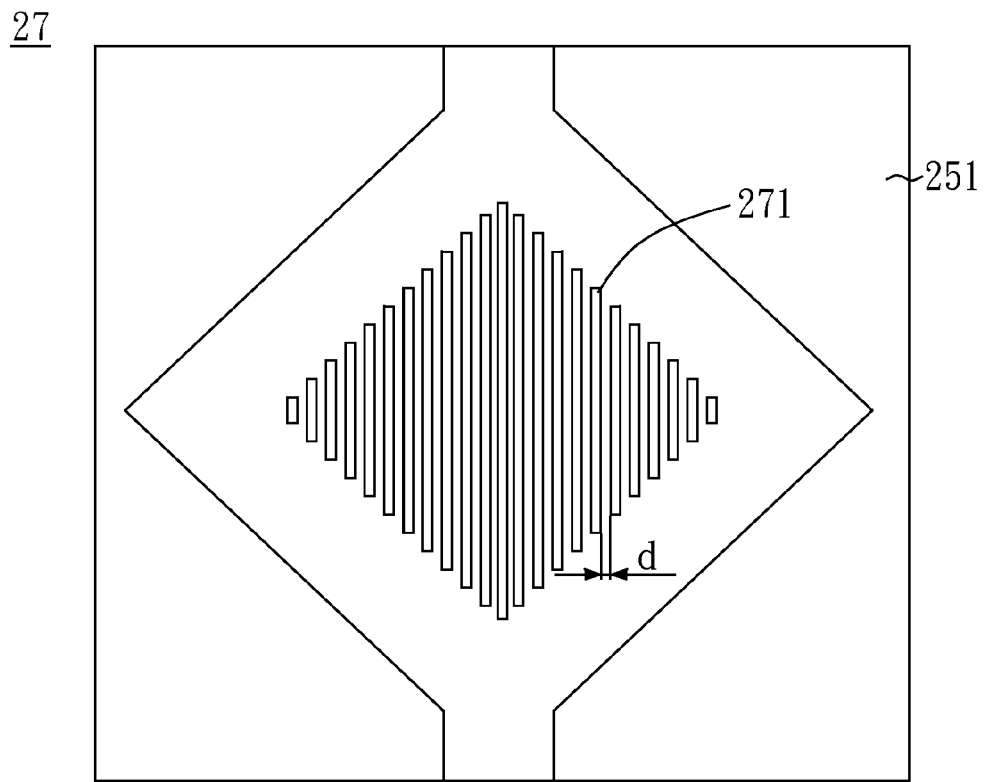
FIG. 4B is a partial, enlarged view of FIG. 4A.

According to another aspect of the embodiment, plural dummy electrodes 27, as shown in a top view of FIG. 4A, are further disposed between adjacent electrode lines 251 (and in a same layer as the electrode lines 251) of a lower electrode layer (for example, the receive layer 25 in FIG. 2). Rhombic dummy electrodes 27 and rhombic electrodes of the receive layer 25 are exemplified in FIG. 4A, while other shapes may be adopted instead. The dummy electrode 27 may be patterned as shown in a partial enlarged view in FIG. 4B. As shown in the figure, each dummy electrode 27 may be patterned to result in plural dummy sub-electrodes 271. In the embodiment, gap d between adjacent dummy sub-electrodes 271 may be less than 30 µm.

Figure 5:
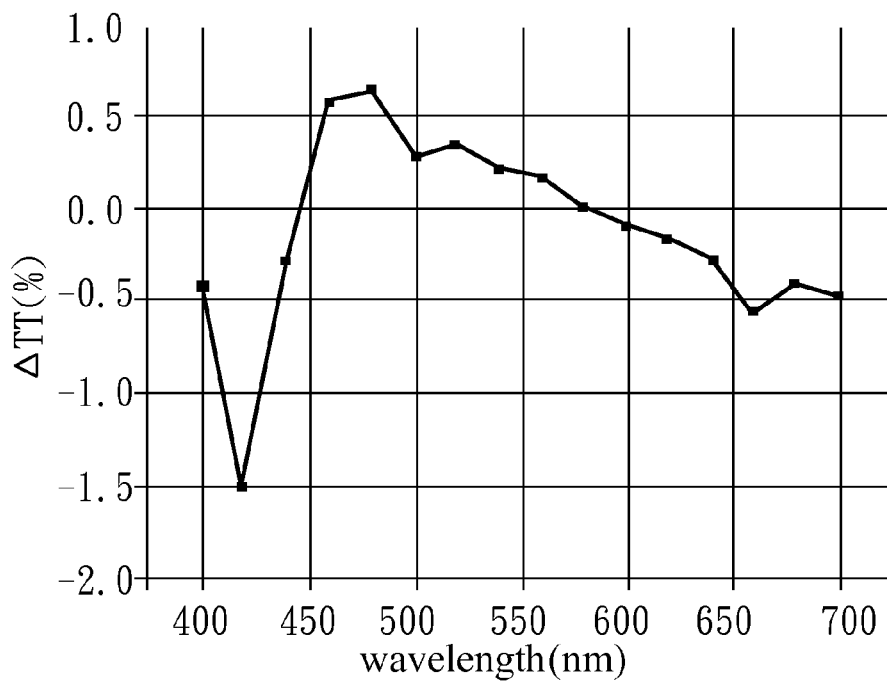
FIG. 5 plots a simulated result for optical transmittance of the embodiment.

According to the first embodiment described above, the composite refractive-index three-layer structure is used in the anti-reflective layer 22 and the dummy electrodes 27 are disposed in a lower electrode layer (for example, the receive layer 25 in FIG. 2), such that trace phenomenon may be reduced in a higher electrode layer (for example, the transmit layer 23 in FIG. 2) and optical transmittance may be increased. FIG. 5 shows a simulated result about optical transmittance of the embodiment with abscissa indicating wavelength and ordinate indicating optical transmittance difference between electrode area and adjacent non-electrode area. Trace phenomenon is minimal when the optical transmittance difference is close to zero. According to the simulated result of FIG. 5, the optical transmittance difference is close to zero in visible range with minimal trace phenomenon.

The transparent cover layer 21 of the embodiment may be made of a material such as glass, polycarbonate (PC), polyethylene terephthalate (PET), polymethyl methacrylate (PMMA) or cyclic olefin copolymer (COC). The transparent substrate 26 of the embodiment may be made of a material such as glass, polyethylene terephthalate (PET), polycarbonate (PC), polymethyl methacrylate (PMMA) or cyclic olefin copolymer (COC).

The transmit layer 23 and the receive layer 25 of the embodiment may be made of a material such as indium tin oxide (ITO) or indium zinc oxide (IZO). The transmit layer 23 and the receive layer 25 may be alternatively made of a non-transparent conductive material such as metal nanowires or metal nanonets. Due to fineness of the metal nanowires/nanonets unobservable to human eyes, the metal nanowires/nanonets may result in a transparent structure.

In the embodiment, the isolation layer 24 is disposed between the transmit layer 23 and the receive layer 25 to prevent electrical shorting. Generally speaking, the isolation layer 24 of the embodiment is transparent, and its reflective index is substantially the same as that of a higher electrode layer (for example, the transmit layer 23 in FIG. 2).

Figure 6:
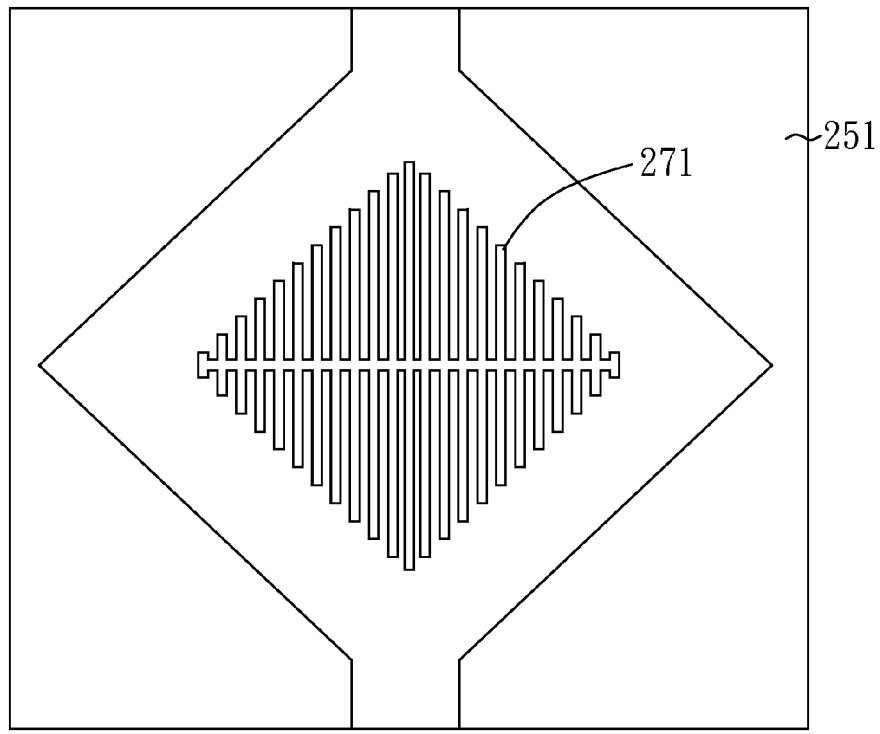
FIG. 6 shows another enlarged partial view of FIG. 4A.

A second embodiment of the present invention continues using the cross-sectional view of the touch panel 200 in FIG. 2. In the embodiment, the transmit layer 23 is disposed above the isolation layer 24 (i.e., near the touch position), and the receive layer 25 is disposed below the isolation layer 24 (i.e., near the display module). The transmit layer 23 and the receive layer 25 are formed in an order opposite to that of the conventional touch panel 100 (FIG. 1). Similar to the first embodiment, plural dummy electrodes 27, as shown in the top view of FIG. 4A, are further disposed between adjacent electrode lines 251 of the receive layer 25 of the present embodiment. In one embodiment, the dummy electrodes 27 are not patterned. In another embodiment, each dummy electrode 27 is patterned, and its adjacent dummy sub-electrodes 271 are physically connected as shown in a partial enlarged view of FIG. 6.

Figure 7A:
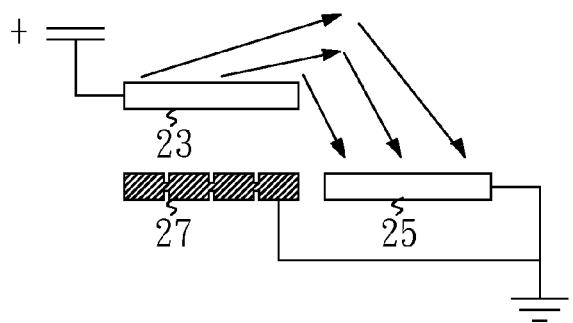
FIG. 7A schematically depicts dummy electrodes and a receive layer electrically coupled to ground.
Figure 7B:
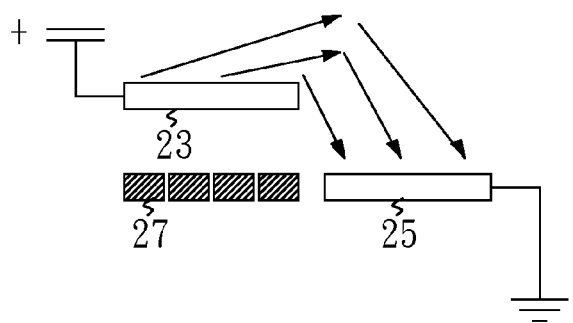
FIG. 7B schematically portrays the dummy electrodes and the receive layer not electrically coupled.

According to one aspect of the embodiment, the receive layer 25 and the dummy electrodes 27 are electrically coupled to a same electric potential. FIG. 7A schematically shows the transmit layer 23, the receive layer 25 and the dummy electrodes 27 of the touch panel 200. Specifically, the dummy electrodes 27 and the receive layer 25 are electrically coupled to ground. FIG. 7B schematically shows the dummy electrodes 27 and the receive layer 25 not electrically coupled to a same electric potential. Therefore, during operation, the dummy electrodes 27 may probably be deprived of efficiency. In the embodiment as demonstrated in FIG. 7A, as the receive layer 25 and the dummy electrodes 27 are electrically coupled to the same electric potential, the dummy electrodes 27 may fully perform their functions such that the touch panel 200 may pass more stringent test requirement, for example, of sustaining 85° C. and humidity 85% for a period of 100 hours.

According to the second embodiment described above, the transmit layer 23 is disposed above the isolation layer 24 and the receive layer 25 is disposed below the isolation layer 24, and the receive layer 25 and the dummy electrodes 27 are electrically coupled to the same electric potential, therefore the touch panel 200 may pass more stringent test requirement and the touch panel of the second embodiment may thus be adaptable to more stringent environment.

Although specific embodiments have been illustrated and described, it will be appreciated by those skilled in the art that various modifications may be made without departing from the scope of the present invention, which is intended to be limited solely by the appended claims.

What is claimed is:

1. A touch panel, comprising:
   an anti-reflective layer including at least one composite refractive-index three-layer structure;
   a transmit layer, an isolation layer and a receive layer, disposed below the anti-reflective layer, the isolation layer being disposed between the transmit layer and the receive layer; and
   a plurality of dummy electrodes disposed in the transmit layer or the receive layer whichever is located below the isolation layer;
   wherein the anti-reflective layer comprises, from top to bottom, a first low-refractive-index layer, a high-refractive-index layer and a second low-refractive-index layer, wherein a refractive index of the high-refractive-index layer is higher than refractive indices of the first low-refractive-index layer and the second low-refractive-index layer.

2. The touch panel of claim 1, further comprising a transparent cover layer disposed above the anti-reflective layer.

3. The touch panel of claim 1, further comprising a transparent substrate disposed below the transmit layer, the isolation layer and the receive layer.

4. The touch panel of claim 1, wherein the first low-refractive-index layer has a thickness of about 10-200 µm, the high-refractive-index layer has a thickness of about 10-500 µm, and the second low-refractive-index layer has a thickness of about 10-500 µm.

5. The touch panel of claim 1, wherein the first low-refractive-index layer, the high-refractive-index layer and the second low-refractive-index layer comprises silicon nitride ($SiN_x$) and silicon dioxide ($SiO_2$).

6. The touch panel of claim 1, wherein the transmit layer or the receive layer whichever is located below the isolation layer comprises a plurality of electrode lines, wherein the dummy electrodes are disposed between adjacent electrode lines, and are disposed in a same layer as the electrode lines.

7. The touch panel of claim 1, wherein the dummy electrode is patterned to result in a plurality of dummy sub-electrodes.

8. The touch panel of claim 7, wherein gap between adjacent dummy sub-electrodes is less than 30 μm.

* * * * *